United States Patent [19]

Yokomizo et al.

[11] Patent Number: 4,760,551
[45] Date of Patent: Jul. 26, 1988

[54] OPERATION UNIT FOR FLOATING POINT DATA WITH VARIABLE EXPONENT-PART LENGTH

[76] Inventors: Goichi Yokomizo, C406, 2-32, Koyasucho, Hachioji-shi, Tokyo; Shunichi Torii, 4-26-16-301, Honcho, Kichijoji, Musashino-shi, Tokyo; Hozumi Hamada, 2-63-7, Kikunodai, Chofu-shi, Tokyo, all of Japan

[21] Appl. No.: 808,476

[22] Filed: Dec. 13, 1985

[30] Foreign Application Priority Data

Dec. 14, 1984 [JP] Japan .................................. 59-264271

[51] Int. Cl.$^4$ ............................ G06F 7/48; G06F 5/00
[52] U.S. Cl. ........................................ 364/748; 235/310
[58] Field of Search ............................... 364/748, 737; 340/347 DD; 235/310

[56] References Cited

U.S. PATENT DOCUMENTS 4,603,323  7/1986  Hassitt et al. ............... 340/347 DD
4,617,641 10/1986  Hamada ............................ 364/748
4,675,809  6/1987  Omoda et al. .................... 364/200

Primary Examiner—Gary V. Harkcom
Assistant Examiner—Tan V. Mai
Attorney, Agent, or Firm—Antonelli, Terry & Wands

[57] ABSTRACT

An operation unit has a significant digit number judging circuit in which to detect as to whether or not a significant digit number of exponent part variable length data obtained as an arithmetic result becomes smaller than a specified minimum significant digit number, this operation unit manipulating data characterized in that exponent and mantissa parts thereof vary in length according to data values and its data length is fixed. In a first embodiment, there is a circuit for detecting the significant digit number of the resultant data with a variable length exponent part, the data being gained by a step wherein exponent and mantissa data are combined by using the exponent data of the resultant fixed length exponent and mantissa data. A second embodiment involves utilization of a circuit in which to detect as to whether or not the significant digit number is lower than a predetermined significant digit number by directly employing the resultant data with the variable length exponent part which data are procured after completion of the combination.

10 Claims, 3 Drawing Sheets

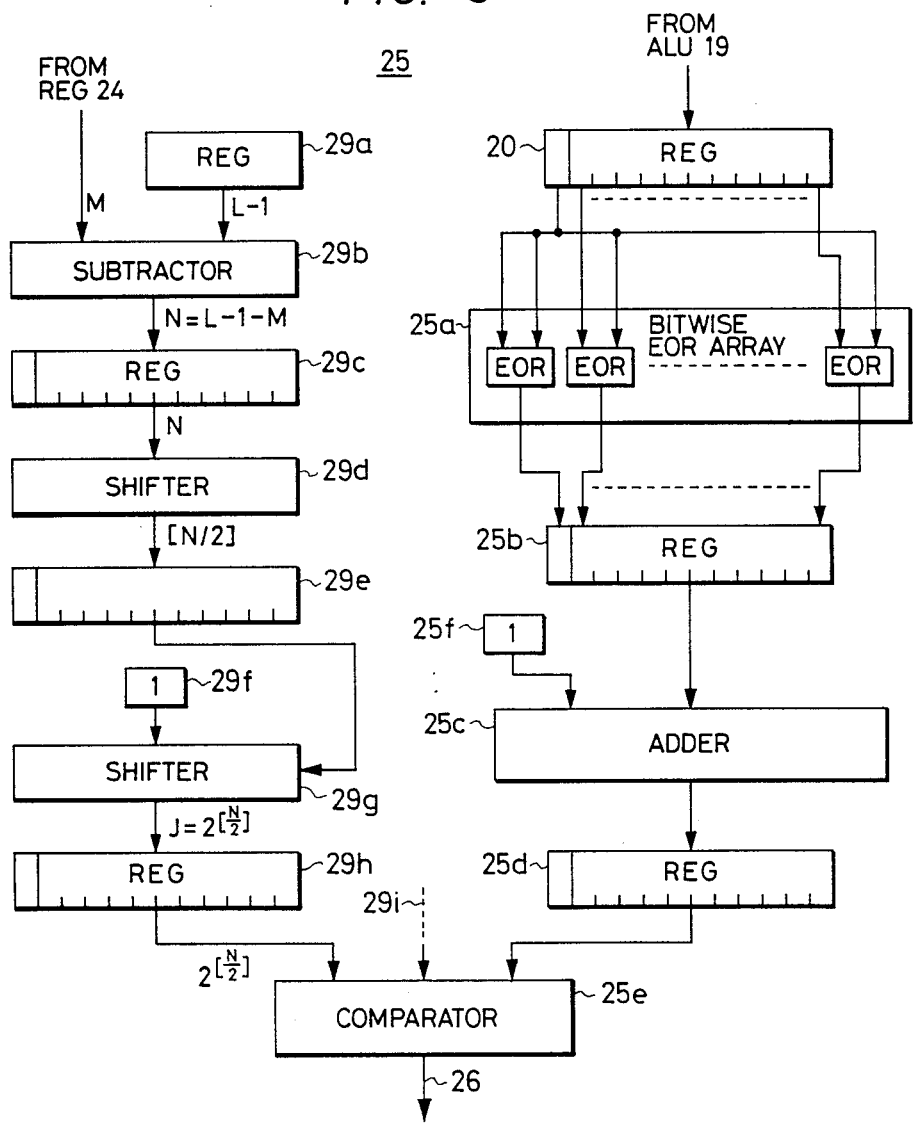

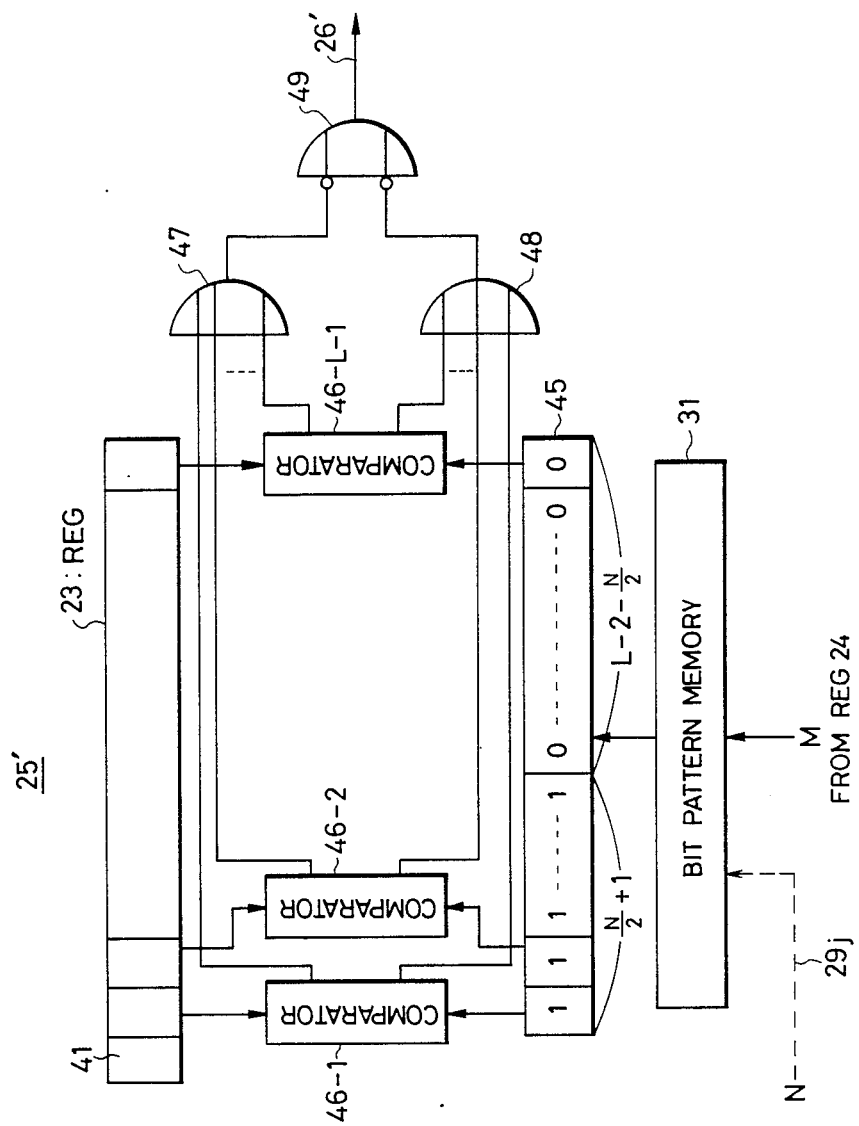

OPERATION UNIT FOR FLOATING POINT DATA WITH VARIABLE EXPONENT-PART LENGTH

BACKGROUND OF THE INVENTION

The present invention relates to an operation unit for floating point data with a variable exponent-part length.

When dealing with real number data by means of a data processor, it is required that an infinite fraction be included in data with a finite length. A floating point expression is in general employed as a notation relative to the real number. Namely, according to this notation, a bit number (hereinafter referred to as data length) given as an amount of information representing the real number is divided into three categories, viz., sign, exponent and mantissa, the lengths of which are rendered invariable regardless of the real number to be indicated. With this notation adopted, a score of the real number that is expressible in length of a part corresponding to the exponent can be determined; and a significant digit number of real number that is expressible in length of a part corresponding to the mantissa can likewise be determined. This notation, however, involves such a defect that the real number to be used differs in scope according to application objects for which the data processor may be employed and hence it is necessary to create a data processor designed for manipulating the floating point number having a length of the part which expresses a proper exponent in conformity with the application objects.

While on the other hand, another notation has been disclosed wherein there are varied lengths of a part (hereinafter referred to as exponent part) for indicating the exponent thereof in dependence upon the real number to be expressed and of a part (hereinafter referred to as mantissa part) for expressing the mantissa. There is exemplified a data length independent real number value notation based on the double exponent fragmentation (Treatise Bullentin issued by the Information Processing Society of Japan, Vol. 22. No. 6, pp. 521–526 (1981)). The data processor capable of adopting such a notation has an advantage of dealing with the scope of the real number which is virtually needed for all the application objects.

For exemplification, a data processor manipulating the data an exponent part length of which is variable has been disclosed in U.S. patent application Ser. No. 543,426, now U.S. Pat. No. 4,617,641, or Ser. No. 772,696 relative to the application of this assignee. The data processor yields the forementioned advantage, whereas the same processor is degraded by a defect that the significant digit number may be reduced during data processing, a rate of which probably exceeds a expected value. This disadvantage is, it seems, referable to the fact that if a notation in which the overall data length is fixed be employed, the significant digit number (viz., mantissa part length) of the data varies in accordance with the real number value to be displayed, inasmuch as the part length corresponding to the mantissa change according to the real number value to be exhibited. Therefore, in case where various kinds of operations are performed by employing the foregoing device, the significant digit number of data becomes smaller than a predetermined value, so that an error created after completion of every operation does not fall within a desired value. A user of this device can not recognize when the error is produced during operations if the significant digit number is less than anticipated, and it is therefore difficult to grasp the reason why the error becomes bigger than the predetermined value.

SUMMARY OF THE INVENTION

Accordingly, it is a primary object of the present invention to provide an operation unit included in a data processor that manipulates a real number expression wherein lengths of an exponent part and a mantissa part are variable, the operation unit being capable of detecting as to whether or not an arithmetic result becomes less than a specified significant digit number during data processing.

The operation unit according to the present invention manipulates data whose feature is such that the exponent and mantissa parts thereof vary in length in accordance with data values, and its data length is rendered invariable, this operation unit being provided with a significant digit number judging circuit in which to detect as to whether or not the significant digit number (viz., length of the mantissa part) of exponent part variable length data obtained as an arithmetic result becomes smaller than a specified minimum significant digit number.

To describe this in a tangible manner, as regards a first embodiment according to the present invention, there is utilized a circuit by making use of the exponent data of fixed length exponent data and fixed length mantissa data acquired as arithmetic outcomes for detecting as to whether or not the significant digit number (viz., mantissa part length) of arithmetically resultant data which has a variable exponent-part length, such data being gained by a step wherein the fixed length exponent data and the fixed length mantissa data are combined.

Moreover, a second embodiment of the invention involves utilization of a circuit in which to detect as to whether or not the significant digit number is lower than a predetermined significant digit number by directly employing arithmetic resulting data with the variable exponent-part length which data are procured after completion of the above-described combination.

BRIEF DESCRIPTION OF THE DRAWINGS

FIG. 2 is a diagram showing an example of floating point data which includes variable exponent-part length used in the present invention;

FIG. 3 is a detail drawing of a significant digit judging circuit provided within the operation unit shown in FIG. 1; and FIG. 4 is a detail drawing of a significant digit judging circuit employed in a second embodiment of the invention.

DETAILED DESCRIPTION OF THE PREFERRED EMBODIMENTS

Figure 1:
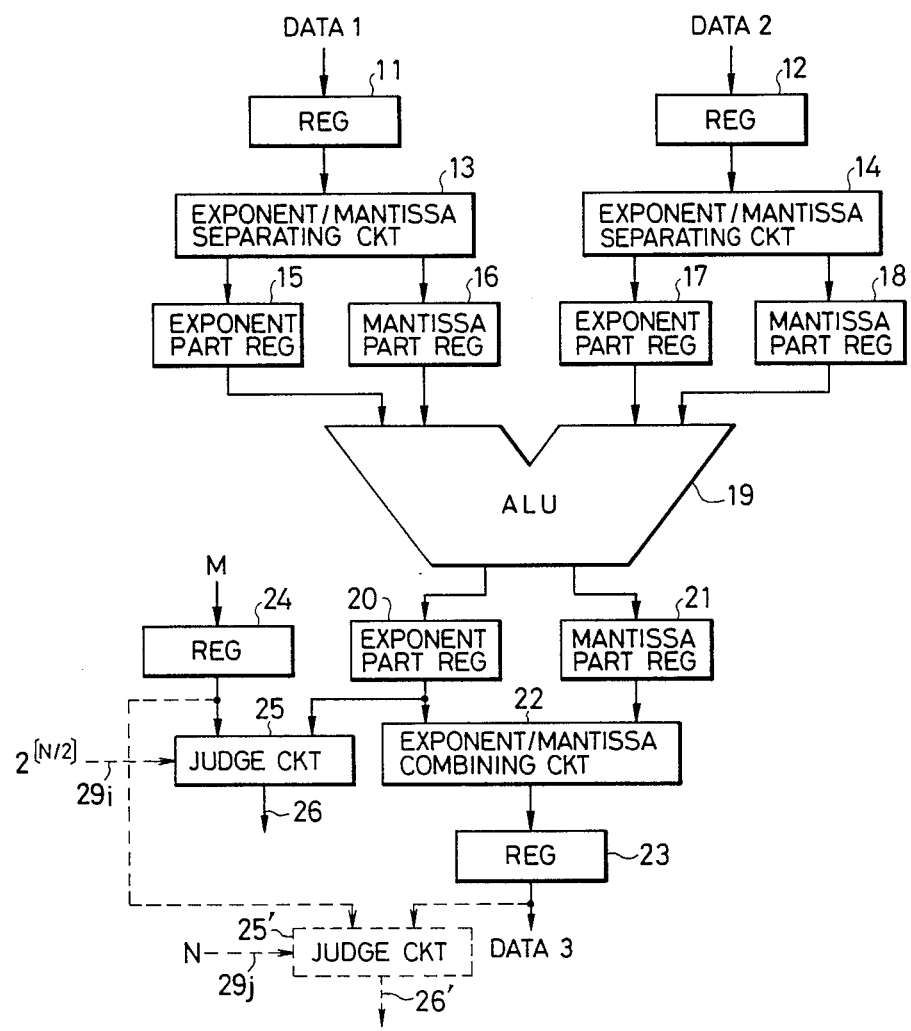
FIG. 1 is a diagram showing a first embodiment of an operation unit according to the present invention.

The present invention will hereinafter be described with reference to the accompanying drawings by exemplifying the preferred embodiments thereof.

Referring now to FIG. 1, there is shown an operation unit of the embodiment according to the present invention. The operation unit comprises: registers 11, 12 for storing data 1, 2 characterized by a variable length exponent expression in which to vary two parts to be processed, viz., exponent and mantissa parts in proportion to data values; exponent-mantissa separation circuits 13, 14 for converting the data 1, 2 into fixed length exponent and mantissa parts; registers 15, 17 for housing the separated fixed length exponent data; registers 16, 18 for storing the separated fixed length mantissa data; an arithmetic or logical operation unit 19 for performing a floating point operation with respect to the data based on the fixed length expression which data are respectively stored in the registers 15 to 18 inclusive; a register 20 for housing the fixed length exponent data to be output as an arithmetic result; a register 21 for storing the fixed length mantissa data to be output as an arithmetic outcome; an exponent-mantissa combining circuit 22 for converting the floating point data according to the fixed length expression which are respectively housed in the registers 20, 21 into floating point data with a variable length exponent-part; a register 23 for storing the thus combined data; a register 24 for holding a specified significant digit number M; and a significant digit number judging circuit 25 for judging as to whether or not the significant digit number (mantissa part length) of a final arithmetic resulting data DATA 3 is lower than the M by referring to the specified significant digit number M and the exponent part length gained as an arithmetic result in the arithmetic or logical operation unit 19 of the register 20.

The present invention adopts a variable length representation (hereinafter referred to as "this representation") wherein an exponent part and a mantissa part change in length in accordance with data values, whose representation has been disclosed in the forementioned documents and the two specifications of U.S. patent application.

This representation will hereinafter be in brief described prior to the detailed description of the embodiments.

(1) A number 0 and infinity in this representation can be expressed as follows:

| 0 | "0 0 0 ... 0" |
|---|---|
| Infinity | "1 0 0 ... 0". |

Numbers other than these concepts are mentioned as under.

(2) Arithmetic relationship between the number X, the exponent e and the mantissa m can be established as follows;

$$X = m \cdot 2^e$$

where e is the integer and m is prescribed in accordance with the sign of X; and $\overline{m}$ is defined as below.
 (a) If $X > 0$, $$1 \leq m < 2, \overline{m} = m - 1$$

(b) If $X < 0$, $$-2 \leq m < -1, \overline{m} = m + 2$$

Moreover, $\overline{e}$ is manifested as:
 (a) If $e \geq 0$, $$\overline{e} = e + 1$$

(b) If $e < 0$, $$\overline{e} = -e$$

In addition, n is expressed in a form such as:

$$n = [\log_2 \overline{e}] + 1$$

However, the symbol [ ] denotes a Gaussian symbol, and [x] represents the maximum integer that does not exceed X at all. This may be the same in the following cases.

(3) A bit layout in this representation is constituted by sign information of one bit, an exponent part of 2n bits and a mantissa part of remaining bits. Lengths of the exponent and mantissa parts are variable according to numeric values to be expressed, whereas the total bit number into which the sign information, the exponent and mantissa parts are combined is rendered immutable.

(4) When $X > 0$, the sign information is 0, whereas if $X < 0$, the same information is 1.

(5) The exponent part is prescribed as follows.
 (a) Left n bits are defined as the column of "1".
 (b) Right n bits are defined as the column in which to change the left end of the bit column with the length n obtained by effecting binary expansion with respect to $\overline{e}$ into "0".
 (c) However, if $X < -1$ or $0 < X < 1$, the exponent part is the complement of 1 of the column determined in the forementioned items (a), (b).

(6) The mantissa part is expressed as below.

When the binary expansion of $\overline{m}$ is performed in a form such as:

$$0.b_1 b_2 b_3 \ldots$$

the mantissa part represents the length required from the left of the following bit column.

$$\text{"}b_1 b_2 b_3 \ldots \text{"}$$

To describe it more tangibly by exemplifying the number 100, this is manifested as:

$$100 = (25/16) \times 2^6$$

Therefore, as prescribed above, $e = 6$, $m = 25/16$ and $\overline{e} = 7$, $\overline{m} = 9/16$, $n = 3$.

FIG. 2 shows a floating point expression on the basis of this representation. The sign bit 1 is "0", for the numeric value is positive. Inasmuch as $n = 3$, 3a, viz., 3 bits of the exponent part is defined as the column of "1", and 3b, viz., right 3 bits thereof is defined as "011" in which to change the initial "1" of the value "111" into "0", this numeric value "111" being obtained by effecting binary expansion with respect to $\overline{e}$.

The binary expansion of $\overline{m}$ takes the following form:

$$0.100100000 \ldots$$

so that a mantissa part 5a is manifested as under:

$$\text{"100100000} \ldots \text{"}$$

The first embodiment shown in FIG. 1 will hereinafter be described in detail.

It can be observed through FIG. 1 that there are employed exponent mantissa separation circuits 13, 14 and an exponent mantissa combining circuit 22 which are the same as those disclosed in the forementioned two specifications of U.S. patent application. These references are incorporated herein by reference.

The exponent mantissa separation circuits 13, 14 convert data DATA 1, DATA 2 as below. The data DATA 1, DATA 2 are respectively housed in the registers 11, 12, and are expressed by this representation, serving as input. The the respective exponent parts of the data DATA 1, DATA 2 are set in the registers 15, 17 after the data have been converted into fixed length exponent data; and each of mantissa parts of the DATA 1, DATA 2 is converted into fixed length mantissa data and is then set in each of the registers 16, 18.

Immediately when the exponent and the mantissa of input data are separated from each other, the floating point arithmetic or logical operation unit 19 functions with a view to effecting floating point operations in regard to the respective input data stored in the registers 15, 16, 17, 18. The thus gained arithmetic resulting data are normalized. The fixed length exponent data of the normalized arithmetic resulting data is output to the registr 20; and the fixed length mantissa thereof is output to the register 21.

After the floating point operation has been completed, the exponent mantissa combining circuit 22 and the significant digit number judging circuit 25 are actuated. In the exponent mantissa combining circuit 22, the arithmetically resultant exponent and mantissa data housed in the registers 20, 21 are converted into the DATA 3 with variable length exponent based on this representation, the DATA 3 corresponding to the above-described exponent and mantissa data. The thus converted DATA 3 is output to the register 23. The operations thus far described are identical with those of the devices disclosed in the two specifications of U.S. patent application.

The significant digit number judging circuit 25 which is featured in the present invention will hereinafter be described. As mentioned above, the data on the basis of this representation includes sign information of 1 bit and the exponent part of 2n bits; and the remaining bits are defined as the mantissa part. Therefore, a maximum bit number N of the exponent part is manifested as follows:

$$N = L - M - 1$$

where L is the bit number equivalent to the data length of the arithmetic resulting data DATA 3 and M is the specified value of bit number (namely, significant digit number of the DATA 3) of the mantissa part. Hence, it is possible to judge as to whether or not the significant digit number of the DATA 3 is less than the specified value M by investigating as to whether or not the length of the exponent part exceeds the N bits.

So far as this representation is concerned, the length of the exponent part is proves to be an even number, and hence, if the N proves an odd number, to satisfy $2n \leq N$, an inequality must be established as:

$$2n \leq N - 1$$

If $\bar{e}$ be defined as mentioned above with respect to the exponent value e of the arithmetic resulting DATA 3, $n = [\log_2 \bar{e}] + 1$, so that the following formulas are established $$\begin{cases} 2\{[\log_2 \bar{e}] + 1\} \leq N & (N: \text{even number}) \\ 2\{[\log_2 \bar{e}] + 1\} \leq N - 1 & (N: \text{odd number}) \end{cases}$$

This means that the length of the exponent part exceeds the N, in case where conditions are expressed as below:

$$\begin{cases} \log_2 \bar{e} \geq N/2 & (N: \text{even number}) \\ \log_2 \bar{e} \geq (N-1)/2 & (N: \text{odd number}). \end{cases}$$

With the Gaussian symbol ([ ]) employed, the forementioned formula can be manifested as:

$$\log_2 \bar{e} \geq [N/2],$$

hence, the following inequality is valid $$\bar{e} \geq 2^{[N/2]}.$$

Furthermore, when $e = e + 1 (e \geq 0)$ and $e = -e (e < 0)$, the following formulas are determined $$\begin{aligned} e + 1 &\geq 2^{[N/2]} & (e \geq 0) \\ -e &\geq 2^{[N/2]} & (e < 0). \end{aligned}$$

Since the exponent e of the arithmetic resulting data DATA 3 is set in the register 20, it is feasible to discern the significant digit number of the DATA 3 by making a comparison between $e + 1$ or $-e$ and $2^{[N/2]}$ based on the specified significant digit number M. The processing in which to seek for $-e$ ($e < 0$) may be such that the respective bits of e is reversed and 1 is then added to the resultant value thereof.

The judging circuit 25 is described with reference to FIG. 3.

First of all, the significant digit number M is supplied from the register 24, and a register 29a holds (L−1) obtained by a step in which to subtract 1 from a data length L, while a register 29f holds the value "1".

In the second place, a subtracter 29b is actuated so as to output the value $(N = L - 1 - M)$ to a register 29c, this value being gained by an arithmetic operation in which to subtract the specified value M from the value (L−1) of the register 29a.

Thirdly, a shifter 29d begins to function in order to output the value ([N/2]) to a register 29e, this value being yielded by a step wherein the value (N) within the register 29c is shifted one bit to the right.

Then, a shifter 29g is actuated for the sake of shifting the value "1" of the register 29f to the left to such an extent as to be equivalent the number of times of the value [N/2] of the register 29d thereby to set it in a register 29h. Thus, the register 29h has the value $2^{[N/2]}$ set therein.

A register 20 which holds the exponent part of the arithmetic resulting data is common to that marked with the same numeral in FIG. 1. The sign bit of the leftmost bit in the register 20 and each of the bits are EORed on a bitwise basis; and the thus created result is output to the register 25b. Owing to this operation, when $e \geq 0$, the value in the register 20 is intactly transferred to the register 25b, whereas if $e < 0$, the respective bits are reversed and then transferred thereto.

1 is added to the value in the register 25b by means of an adder 25c and the thus added result is then output to the register 25d. With this step, $-e$ is set in the register 25d when $e < 0$, and $e + 1$ is set when $e \geq 0$.

Thereafter, a comparator 25e functions in order to compare the value in the register 29h with that existing in the register 25d. In case where the value pertaining to the register 25d is equal to or exceeds the value in a register 29h, an interrupt signal 26 is set "ON". While on the other hand, if the forementioned value is less than that existing in the register 29h, the interrupt signal is kept in a state of "OFF".

In the embodiment so far described, there is shown a case in which the significant digit number M is input from outside. Instead, it is permitted that the data displays the value $2^{[N/2]}$ corresponding to the significant digit number M is supplied via a dotted line 29i shown in FIG. 3 to the comparator 25e. In addition, it is possible to employ memories as substitutes for the respective elements 29a to 29h inclusive shown in FIG. 3, the memories strong the data which exhibit the numeric value $2^{[N/2]}$ corresponding to the significant digit number M.

The second embodiment will hereinafter be described. As regards the first embodiment, the judging operation is conducted by employing the exponent part data in the register 20, this data being characterized in that the exponent and mantissa parts thereof are separated from each other. The second embodiment, however, involves utilization of a judging circuit 25' (FIG. 1) in which to perform the judging operation by making use of the data of real number value in the register 23 which data is based on this representation. In this representation, it can be highlighted in terms of utilization that the number of column of "1" or "0" consecutively stretched from the left corresponds to the length of the exponent part.

The judging circuit 25' is at full length described with reference to FIG. 4.

In FIG. 4, the numeral 23 stands for a register for holding arithmetic resulting data according to this representation, the register being the same as that shown in FIG. 1. The numeral 45 is a constant register; 46−1∼46-L-1 are bitwise comparators. The numerals 47, 48 and 49 denote logical circuits. Moreover, the numeral 31 stands for a bit pattern memory. The length of the constant register 45 is L-1, where L is the bit number equivalent to the data length of the data DATA 1, DATA 2, DATA 3.

When the specified significant digit number M of the register 24 (FIG. 1) is input as an address to the bit pattern memory 31, this memory 31 then performs a step in which to create the bit column of the value "1" consisting of (N/2+1) (however, $N=L-1-M$) bits and also the bit column of the value "0" constituted by (L−2−N/2) bits thereby to output the result to the register 45. Where the significant digit number is equal to or greater than the M, the exponent part length is, as mentioned above, less than the N. Therefore, the bit column "1" or "0" of the first half of the exponent part must be N/2 bits or less. Hence, provided that there exists a column of "1" or "0" exceeding (N/2) bits, the mantissa part length is invariably lower than the M. The column of "1" of (N/2+1) bits is generated for the purpose of making use of these characteristics. The data in the register 45 is compared on a bitwise basis with the arithmetic resulting data exclusive of a sign bit 41 thereof in the register 23. If the input from the register 45 be defined as "1", each of the comparators 46−1∼46−L−1 outputs same value as the value in the register 23 to the OR gate 47 and the inverse value of the value in the register 23 to OR gate 48. Alternatively, if the input from the register 45 be defined as "0", the value "0" is output to the OR gate 47 and OR gate 48 regardless of the value of the input from the register 23.

Consequently, only when all the bit columns of the arithmetic resulting register 23 which columns correspond to the bit column of "1" of the constant register 45 are defined as "1", the output of the OR gate 48 with common bit columns becomes "0". Furthermore, only when the same parts of the arithmetic resulting register 23 are all "0", the output of the OR gate 47 becomes "0". If either of the outputs of the OR gates 47, 48 is defined as "0", an output 26' of the NOT-OR gate 49 becomes "1". By virtue of this process, it is feasible to judge as to whether or not the significant digit number gained by effecting the arithmetic operation is lower than the specified value M.

In this embodiment, the significant digit number M of the mantissa part is given from outside. Instead, it is permitted that the N, which is manifested such as $N=L-1-M$, is given from outside via the dotted line 29j to the bit pattern memory 31 by which to create the forementioned bit pattern. Moreover, according to this embodiment, there are generated columns of "1" of (N/2+1) bits and of "0" of (L−2−N/2) bits. It is, however, easy for those skilled in the art to replace the value of the bits which are to be yielded.

What is claimed is:

1. An operation unit comprising:
  a first converting means for converting a first floating point data into a second floating point data including a fixed length exponent-part and a fixed length mantissa part, said first floating point data having a fixed data length and including an exponent part and a mantissa part whose lengths vary according to data values;
  an arithmetic or logical operation means for operating on said second floating point data and for outputting a third floating point data including a fixed length exponent part and a fixed length mantissa part, said arithmetic or logical operation means being operatively connected to said first converting means;
  a second converting means for converting said third floating point data into a fourth floating point data including an exponent part and a mantissa part having lengths which depend on the data values thereof; and
  determination means responsive to said third floating point data and a limit data for determining whether said mantissa part length of said fourth floating point data is less than an allowable minimum length.

2. An operation unit as set forth in claim 1, wherein said determination means determines whether the value of said exponent part of said fourth floating point data exceeds an allowable maximum value on the basis of said allowable minimum length of said mantissa part of said fourth floating point data, said determination means being operatively connected to said arithmetic or logical operation means and being responsive to said limit data and said exponent part of said third floating point data.

3. An operation unit as set forth in claim 2, wherein said limit data expresses said allowable minimum length of said mantissa part of said fourth floating point data, and wherein said determination means includes means for generating data which expresses an allowable maximum value relative to said third floating point data in response to said limit data and means for determining whether a value of said exponent part of said third floating point data exceeds said generated data which express said allowable minimum value relative to said third floating point data.

4. An operation unit as set forth in claim 2, wherein said limit data expresses said allowable maximum value corresponding to said third floating point data, and wherein said determination means determines whether said third floating point data exceeds said limit data.

5. An operation unit as set forth in claim 2, wherein each of said exponent parts of said first and fourth floating point data consists of a first part including a column of binary digits "1" or "0" having a length which depends on each of said exponent part lengths thereof, and a second part which indicates the size of said exponents of said data and has a length which depends on said length of said first part.

6. An operation unit as set forth in claim 1, wherein each of said exponent parts of said first and fourth floating point data consists of said first part including a column of binary digits "1" or "0" having a length which depends on each of said exponent part lengths thereof, and a second part which expresses the size of said exponents of said data and has a length which depends on said length of said first part.

7. An operation unit as set forth in claim 6, wherein said determination means determines whether the length of said first part of said fourth floating point data exceeds an allowable maximum length on the basis of said allowable minimum length of said mantissa part thereof, said determination means being operatively connected to said second converting means and being responsive to said limit data and said fourth floating point data.

8. An operation unit as set forth in claim 7, wherein said limit data expresses said allowable minimum length of said mantissa part of said fourth floating point data, and wherein said determination means includes means for providing a bit pattern having a length equivalent to the sum of said exponent part length and said mantissa part length of said fourth floating point data in response to said limit data, said bit pattern having a first part including only first value bits which are longer by at least one bit than said allowable maximum length for said first part of said fourth floating point data and a second part including only second value bits; and means for determining whether all bits of a part of said fourth floating point data which includes bits which are located at the same bit positions as said first part of said bit pattern as defined as a binary "0" or "1" by making a comparison with each bit position between said bit pattern and said fourth floating point data.

9. An operation unit as set forth in claim 8, wherein said limit data indicates said allowable minimum value for said fourth floating point data.

10. An operation unit as set forth in claim 8, wherein said limit data indicates said allowable maximum value for said first part of said fourth floating point data.

* * * * *